(No Model.)
W. S. GRIFFITH.
FEEDER FOR TANKS OR RESERVOIRS.
No. 447,407. Patented Mar. 3, 1891.
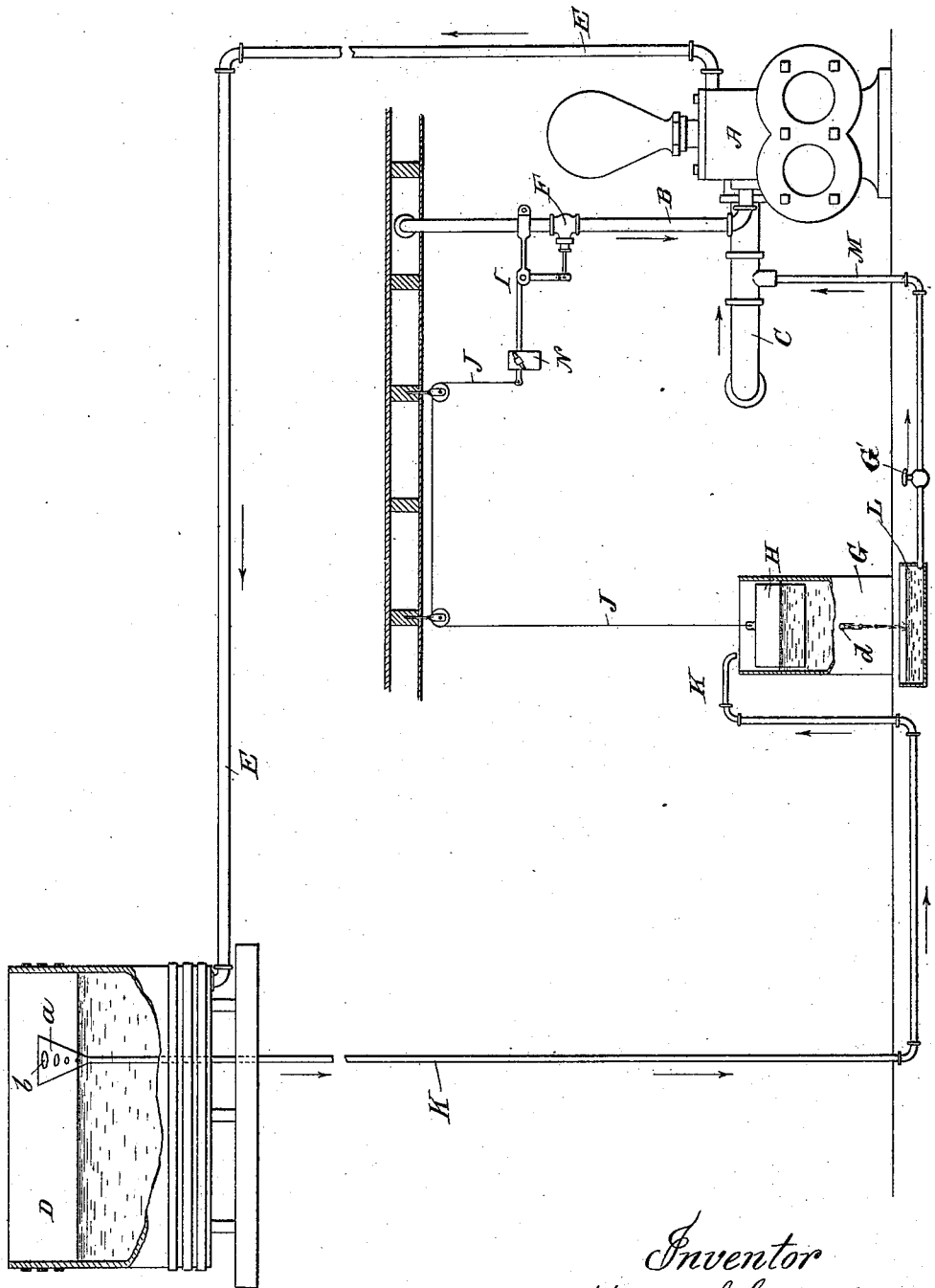

UNITED STATES PATENT OFFICE.

WILFRED S. GRIFFITH, OF AMBLER, PENNSYLVANIA.

FEEDER FOR TANKS OR RESERVOIRS.

SPECIFICATION forming part of Letters Patent No. 447,407, dated March 3, 1891.

Application filed July 16, 1890. Serial No. 358,886. (No model.)

*To all whom it may concern:*

Be it known that I, WILFRED S. GRIFFITH, a citizen of the United States, residing at Ambler, in the county of Montgomery and State of Pennsylvania, have invented certain new and useful Improvements in Feeders for Tanks or Reservoirs; and I do hereby declare the following to be a full, clear, and exact description of the invention, such as will enable others skilled in the art to which it appertains to make and use the same.

My invention relates to feeders for tanks or reservoirs for the temporary storage of water or other liquids, and has for its object to provide a new and improved means for automatically controlling the action of the pump, engine, or other motor employed in filling the tanks by the rise and fall of the liquid contained in the latter, the pump being stopped when the water in the tank reaches a predetermined level, and being started again when by reason of its withdrawal for use it falls below that point whereby an approximately constant volume of liquid is maintained in the tanks.

The invention consists in arranging within the tank an overflow-pipe into which the water flows upon reaching a certain height, said overflow-pipe leading to a small auxiliary reservoir containing a float connected with suitable mechanism which controls the action of the pump or engine, whereby when the water in the tank rises above the mouth of the overflow-pipe the volume of water in the auxiliary reservoir is increased, raising the float and stopping the pump, the auxiliary reservoir being provided with waste-orifices through which the water escapes, allowing the float to fall, thereby restarting the pump.

The accompanying drawing represents in elevation my invention applied to an ordinary water-tank or cistern.

A denotes a steam-pump of any preferred type.

B is the pipe supplying steam to the same from any suitably-arranged boiler.

C is an inlet-pipe leading from the street-main or other source of water-supply to the pump.

D is the tank or reservoir, located at any required distance from or height above the pump.

E is the supply-pipe leading from the pump and entering the tank at the top, bottom, or side, as preferred.

F is the throttle or valve which controls the admission of steam to the pump.

G is an auxiliary reservoir, in which plays the float H, the latter being connected with the bell-crank lever I by a cord J or other flexible connection passing over suitable guide-pulleys. The valve F may be of any preferred type, that shown being the well-known slide-valve. One arm of the bell-crank lever is link connected with the piston of this valve, the other arm of the lever being provided with an adjustable weight N, for a purpose to be hereinafter described.

K denotes an overflow-pipe extending up through the bottom of the tank and having its upper end arranged at the maximum height to which the liquid is intended to rise. The upper end of this pipe is made flaring or funnel-shaped, as shown at *a*, and has a vertical series of graduated openings *b* in one side, or instead of these openings a V-shaped notch may be cut therein. The auxiliary reservoir G is provided on one side with a vertical line of graduated escape-apertures *d*.

L is a drip-pan conveniently situated below the auxiliary reservoir, into which the water in the reservoir G escapes through the apertures, and from which it may be conducted to any desired point. My invention contemplates the return of this waste water to the pump. For this purpose I provide a pipe M, leading from the drip-pan to the pump or the inlet-pipe near the pump, as shown.

The construction and arrangement being as thus described, the operation is as follows: The pump being started, the water or other liquid is forced into the tank through the pipe *e* until it rises to the level of the mouth of the overflow-pipe. Continuing for a time to rise, it runs into the mouth of the pipe in gradually-increasing volume as it passes the graduated openings *b*. This overflow is discharged into the auxiliary reservoir G, causing the float H therein to rise, slacking the connection J, and allowing the weight N on the long arm of the bell-crank lever to depress the same, closing the valve and shutting off the steam, when the operation of the pump ceases and no more water will be forced into the tank.

The weight on the bell-crank lever will keep the valve closed until the water escapes from the auxiliary reservoir, permitting the float to fall, overbalancing and raising the weight, and reopening the valve. As before described, the water in the reservoir G escapes through the orifices $d$ into the drip-pan, whence it is drawn by the action of the pump into the inlet-pipe or to the pump direct.

The object of the graduated orifices in the mouth of the overflow-pipe and the reservoir G is to insure a gradual and noiseless overflow and discharge and an easy and sensitive working of the mechanical parts. Were the mouth of the overflow not provided with some means to regulate the inflow of the water, owing to the enormous difference between the diameter of the pipe and that of the tank, the water would rush into the pipe in such volume as to cause a noisy and jerky action of the system. It will thus be seen that the arrangement of these graduated openings in the overflow-pipe and the graduated escape-apertures in the reservoir insure a sensitiveness in the working of the apparatus.

It will be readily understood that the overflow-pipe may open into the bottom or side of the reservoir G instead of at the top, as shown; but I prefer the latter arrangement, as it discharges the water upon the top of the float and keeps the latter in motion and prevents clogging of the escape-apertures. It is also, apparent that either set of the graduated apertures may be used without the other; also, that in some combinations it is not essential that they be graduated as described. The purpose of making the weight end adjustable is to properly proportion the force required to actuate the bell-crank lever to the weight of the float.

I do not intend to be limited to the exact arrangement of parts herein shown and described, or to the details of construction, as they are obviously capable of extensive modification within the range of mechanical skill.

Although I have shown in the drawing and hereinabove described the invention in connection with a steam-pump, it is obvious that the pump may be driven by any other kind of motor, the apparatus being then arranged to ship a belt or shift a clutch, as the circumstances of the case may require.

A suitable cock G' should be provided in the pipe M for the purpose of closing this pipe against the admission of air when the water contained in the drip-pan L has been withdrawn by suction, as above described, and returned to the pump.

Having thus described my invention, what I claim, and desire to secure by Letters Patent, is—

1. The combination of the pump, the pipe leading thence to the tank, the overflow-pipe, the auxiliary reservoir connected therewith, the float in the reservoir, and mechanism actuated by the float to stop and start the pump, substantially as described.

2. The combination of the pump, the tank, the supply-pipe for the latter, the overflow-pipe, the auxiliary reservoir having escape-orifices, the float in the reservoir, the weighted bell-crank lever, and the flexible connection between the latter and the float, substantially as described.

3. The combination of the pump, the pipe leading thence to the tank, the overflow-pipe projecting into the tank and having graduated openings at its upper end, the auxiliary reservoir having escape-apertures, the float therein, the pivoted bell-crank lever, one arm controlling the application of power to the pump and the other carrying an adjustable weight, and a flexible connection between the lever and the float, substantially as described.

4. The combination of the pump, the tank, the supply-pipe for the latter, the overflow-pipe projecting into the tank and having a funnel-shaped mouth with graduated openings, as described, the auxiliary reservoir having escape-apertures, the float in the reservoir, and mechanism connected therewith for stopping and starting the pump, as and for the purpose set forth.

5. The combination of the pump, the pipe leading therein to the tank, the overflow-pipe from the latter, the auxiliary reservoir having escape-apertures, the float, mechanism connected with the latter for controlling the action of the pump, the drip-pan, and the pipe leading thence to the pump, substantially as described.

6. The combination of the pump, the tank, the supply-pipe for the latter, the overflow-pipe projecting up into the tank, the funnel-shaped mouth with graduated openings, the auxiliary reservoir having the graduated escape-apertures, the float, the weighted bell-crank lever controlling the application of power to the pump, the flexible connection between the float and the lever, the drip-pan, and the pipe leading thence to the pump, substantially as described.

In testimony whereof I affix my signature in presence of two witnesses.

WILFRED S. GRIFFITH.

Witnesses:
LEWIS R. DICK,
GEO. E. OBERER.